US011973273B2

(12) United States Patent
Sundararajan et al.

(10) Patent No.: US 11,973,273 B2
(45) Date of Patent: Apr. 30, 2024

(54) HIGH PERFORMANCE FOLDED DIPOLE FOR MULTIBAND ANTENNAS

(71) Applicant: JOHN MEZZALINGUA ASSOCIATES, LLC, Liverpool, NY (US)

(72) Inventors: Niranjan Sundararajan, Clay, NY (US); Jiaqiang Zhu, Baldwinsville, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 0 days.

(21) Appl. No.: 18/108,851

(22) Filed: Feb. 13, 2023

(65) Prior Publication Data

US 2023/0299505 A1 Sep. 21, 2023

Related U.S. Application Data

(63) Continuation of application No. 17/468,803, filed on Sep. 8, 2021, now Pat. No. 11,581,660.

(Continued)

(51) Int. Cl.

*H01Q 21/26* (2006.01)
*H01Q 9/26* (2006.01)

(Continued)

(52) U.S. Cl.

CPC ............... *H01Q 21/26* (2013.01); *H01Q 9/26* (2013.01); *H01Q 1/523* (2013.01); *H01Q 5/371* (2015.01);

(Continued)

(58) Field of Classification Search

CPC .......... H01Q 21/26; H01Q 9/26; H01Q 1/523; H01Q 21/062; H01Q 21/0075; H01Q 5/371

See application file for complete search history.

(56) References Cited

U.S. PATENT DOCUMENTS 9,698,486 B2 7/2017 Shooshtari et al.
9,711,871 B2 7/2017 Jones (Continued)

FOREIGN PATENT DOCUMENTS

WO 2017176386 A1 10/2017
WO 2017177091 A1 10/2017
WO 2019072390 A1 4/2019

OTHER PUBLICATIONS

International Search report and Written Opinion issued for Application No. PCT/US2021/049347, dated Mar. 7, 2022.

(Continued)

*Primary Examiner* — Joseph J Lauture

(74) *Attorney, Agent, or Firm* — Meunier Carlin & Curfman LLC

(57) ABSTRACT

Disclosed is a radiator assembly configured to operate in the range of 3.4-4.2 GHz. The radiator assembly comprises a folded dipole with four dipole arms that radiate in two orthogonal polarization planes, whereby the signal of each polarization orientation is radiated by two opposite radiator arms that radiate the signal 180 degrees out of phase from each other. The radiator assembly has a balun structure that includes a balun trace that conductively couples to a ground element on the same side of the balun stem plate. The combination of the shape of the folded dipole and the balun structure reduces cross polarization between the two polarization states and maintains strong phase control between the opposing radiator arms.

8 Claims, 8 Drawing Sheets

Related U.S. Application Data

(60) Provisional application No. 63/075,394, filed on Sep. 8, 2020.

(51) Int. Cl.
*H01Q 1/52* (2006.01)
*H01Q 5/371* (2015.01)
*H01Q 21/00* (2006.01)
*H01Q 21/06* (2006.01)

(52) U.S. Cl.
CPC ....... *H01Q 21/0075* (2013.01); *H01Q 21/062* (2013.01)

(56) References Cited

U.S. PATENT DOCUMENTS

| | | | |
|---|---|---|---|
| 9,819,084 | B2 | 11/2017 | Zimmerman et al. |
| 10,439,285 | B2 | 10/2019 | Isik et al. |
| 10,601,120 | B2 | 3/2020 | Bisiules et al. |
| 2004/0183739 | A1 | 9/2004 | Bisiules et al. |
| 2017/0062940 | A1 | 3/2017 | Cao |
| 2018/0034165 | A1 | 2/2018 | Aleksandrovich et al. |
| 2018/0323513 | A1 | 11/2018 | Varnoosfaderani et al. |
| 2019/0280377 | A1* | 9/2019 | Zhang .................... H01Q 1/523 |
| 2020/0185838 | A1 | 6/2020 | Li et al. |
| 2020/0321700 | A1 | 10/2020 | Wu et al. |

OTHER PUBLICATIONS

International Preliminary Report on Patentability issued for Application No. PCT/US2021/049347, dated Mar. 23, 2023.

* cited by examiner

HIGH PERFORMANCE FOLDED DIPOLE FOR MULTIBAND ANTENNAS

BACKGROUND OF THE INVENTION

This application is a continuation of U.S. patent application Ser. No. 17/143,405, filed Jan. 7, 2021, which claims priority to U.S. Provisional Patent Application Ser. No. 63/075,394, filed Sep. 8, 2020, which application is hereby incorporated by this reference in its entirety.

FIELD OF THE INVENTION

The present invention relates to wireless communications, and more particularly, to antennas that incorporate multiple dipole arrangements in several frequency bands.

RELATED ART

The introduction of new spectrum for cellular communications presents challenges for antenna designers. In addition to the traditional low band (LB) and mid band (MB) frequency regimes (617-894 MHz and 1695-2690 MHz, respectively), the introduction of C-Band and CBRS (Citizens Broadband Radio Service) provides additional spectrum of 3.4-4.2 GHz. Further, there is demand for enhanced performance in the C-Band, including 4×4 MIMO (Multiple Input Multiple Output as well as 8T8R (8-port Transmit, 8-port Receive) with beamforming.

The higher frequencies of C-B and allow the implementation of proportionately smaller dipoles within the antenna, and thus creating beamforming arrays within a conventional macro antenna, e.g., four rows of C-Band dipole columns in the case of an 8T8R array. Implementing beamforming and beam steering in the azimuth direction, as is required for 8T8R beamforming, places strenuous performance requirements on the C-Band dipoles themselves. This is because performance deficiencies in a given dipole or radiator assembly multiply when combining radiator assemblies into an 8T8R array. For example, the C-Band dipoles are susceptible to cross polarization, in which the energy radiated by the dipole and/or balun structure of one polarization (e.g., +45 degrees) may cause excitation in the dipole and/or balun structure of the opposite polarization (e.g., −45 degrees) in the same radiator assembly. A cross polarization contamination of 15 dB can severely degrade the gain of a C-B and 8T8R array, affect MIMO performance, and cause leakage between transmit array and the receive array. Further, proper beamforming (e.g., without grating lobes) requires adjacent dipoles be spaced roughly 0.52 apart. With conventional half-λ dipole structures, it becomes difficult to place the dipoles accordingly because the dipole structures either abut or otherwise cannot be spaced close enough without their structures physically interfering with each other or causing coupling between adjacent radiators. Third, as the dipoles get smaller (in the case of C-B and, a problem may arise with the balun structures whereby balun re-radiation may cause dipole arm excitation asymmetry.

Accordingly, what is needed is a dipole structure for high frequencies (e.g., C-B and) that does not suffer from cross polarization interference and dipole arm excitation asymmetry, and is able to be packed together in close proximity to other dipoles to enable beamforming without incurring grating lobes.

SUMMARY OF THE DISCLOSURE

An aspect of the present disclosure involves a radiator assembly configured to radiate two orthogonally polarized radio frequency signals. The radiator assembly comprises a folded dipole having first pair of dipole arms configured to radiate in a first polarization orientation and a second pair of dipole arms configured to radiate in a second polarization orientation, wherein the folded dipole is formed of a single conductive plate; and a balun stem mechanically couled to the folded dipole, the balun stem having a first balun stem plate configured to couple a first radio frequency signal to the first pair of dipole arms and a second balun stem plate configured to couple a second radio frequency signal to the second pair of dipole arms.

BRIEF DESCRIPTION OF THE DRAWINGS

The accompanying figures, which are incorporated herein and form part of the specification, illustrate embodiments of high performance folded dipole for multiband antennas. Together with the description, the figures further serve to explain the principles of the High performance folded dipole for multiband antennas described herein and thereby enable a person skilled in the pertinent art to make and use the high performance folded dipole for multiband antennas

DESCRIPTION OF EXEMPLARY EMBODIMENTS

Accordingly, the present invention is directed to high performance folded dipole for multiband antennas that obviates one or more of the problems due to limitations and disadvantages of the related art.

Figure 1A:
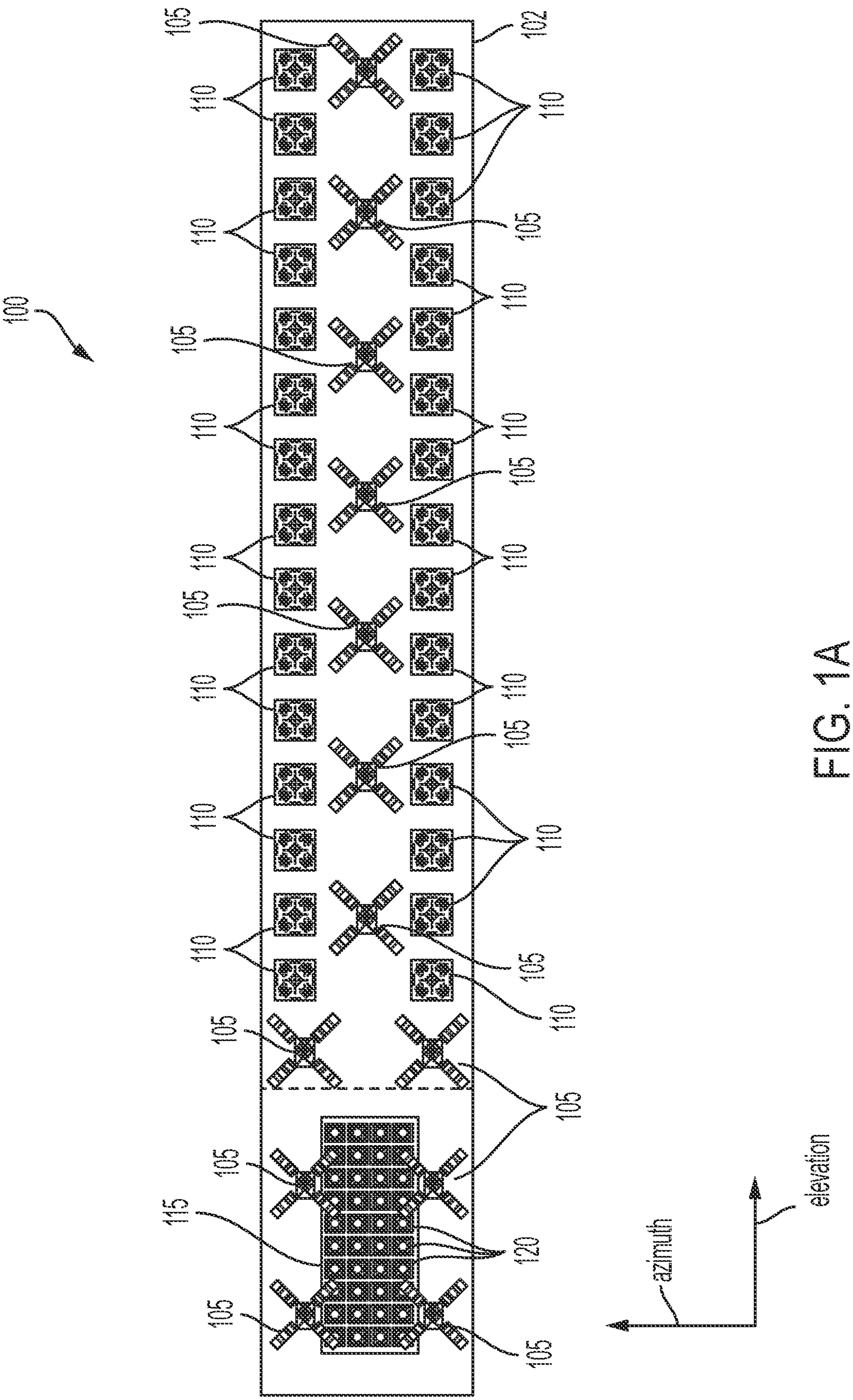
FIG. 1A illustrates an exemplary array face of multiband antenna according to the disclosure.

FIG. 1A illustrates an exemplary multiband antenna array face 100*a* according to the disclosure. Array face 100*a* has a reflector 102, on which are disposed a plurality of low band radiators 105, mid band radiators 110, and upper band radiators 120, which are disposed in an 8T8R beamforming array 115. In this example, the upper band radiators are C-Band radiators, which may have extended coverage to include CBRS for a total range of 3.4-4.2 GHz. In this case upper band radiators 120 may be referred to as C-Band radiators 120, as a particular example.

Typical deployment of multiband antenna having array face 100*a* is such that it is mounted vertically, with its elevation axis (illustrated in FIG. 1A) in the vertical direction.

Figure 1C:
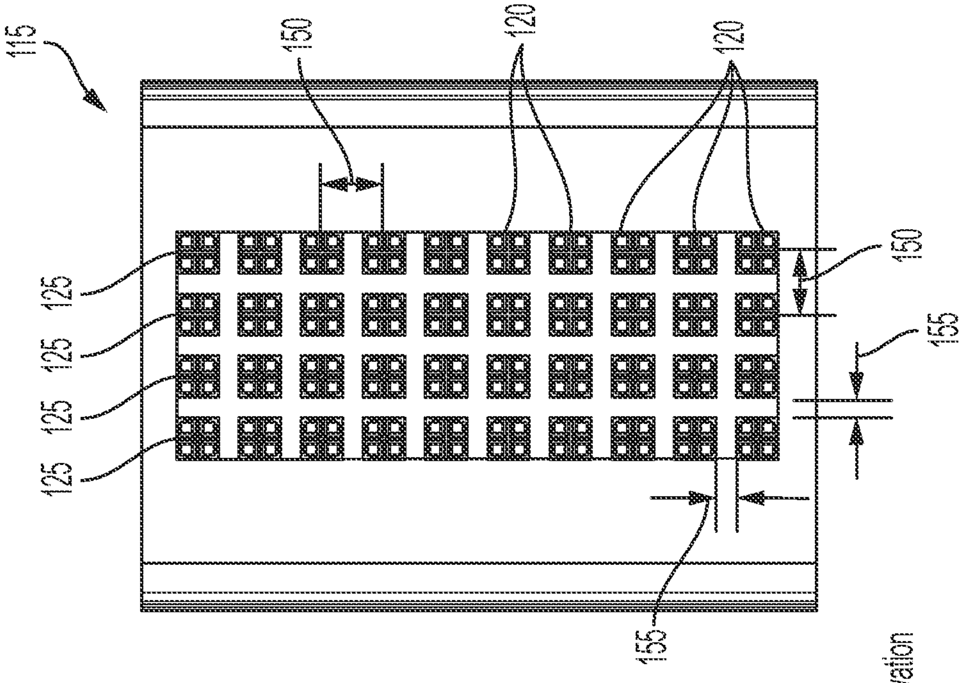
FIG. 1C illustrates an exemplary C-Band 8T8R beamforming array according to the disclosure.
Figure 1B:
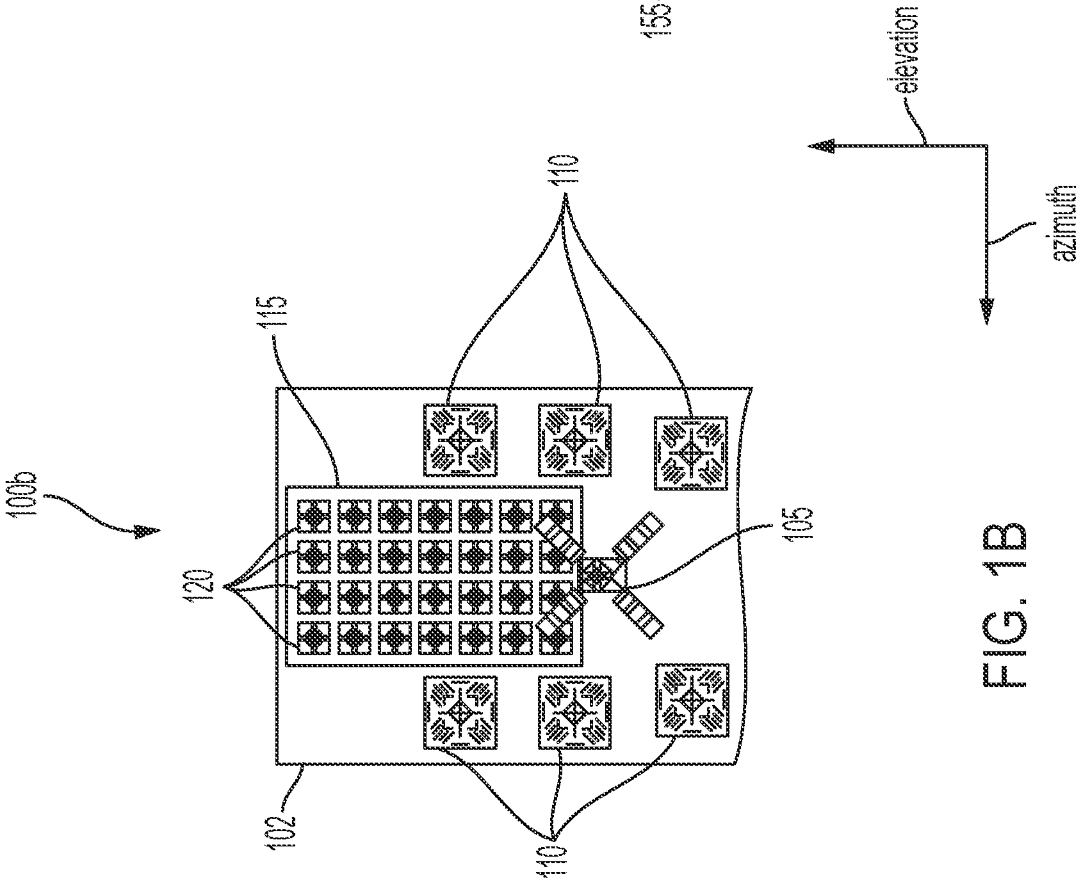
FIG. 1B illustrates an exemplary smaller array face, or portion of a larger array face, including a C-Band 8T8R beamforming array, according to the disclosure.

FIG. 1B illustrates exemplary smaller array face 100*b*, which may be a portion of a larger array face, according to the disclosure. Smaller array face 100*b* includes a C-Band 8T8R beamforming array 115, which may be similar or identical to the C-Band 8T8R beamforming array 115 of FIG. 1A. Also disposed on the radiator 102 of smaller array face 100*b* is a plurality of mid band radiators 110 and low band radiator 105 that are in close proximity to C-Band 8T8R beamforming array 115.

FIG. 1C illustrates a C-Band 8T8R beamforming array 115 according to the disclosure. C-Band 8T8R beamforming array 115 has a plurality of C-B and radiators 120, arranged in four columns 125. Each column 125 of C-Band radiators 120 may be coupled to a respective pair of ports (not shown) so that each C-Band radiator 120 may operate independently at two different polarization orientations, e.g., +/−45 degrees. Each C-Band radiator 120 in a given column 125 may radiate the same two signals (one per polarization) and thus may share a single pair of ports. The columns 125 may be oriented vertically along the elevation axis as shown, and each column 125 may be placed side-by-side along the azimuth axis. As illustrated in FIG. 1B, each column 125 may have ten C-Band radiators spaced linearly along the elevation axis. Further, more or fewer C-Band radiators 125 may be present within each of the columns 125.

As mentioned above, in accordance with 8T8R operation, each column 125 is provided two ports, one per+/−45 degree polarization. Accordingly, it is possible to perform beamforming in the azimuth direction (i.e., around the elevation axis) by providing a single RF signal to the four columns 125, but with differential amplitude an phase weighting to each of the columns 125 to provide beamforming and scanning of the formed beam, as is described further below. For beamforming or beamsteering in the elevation direction (i.e., around the azimuth axis), a phase shifter (not shown) may be used to provide differential phasing (and potentially differential amplitude and phase weighting) to each of the C-Band radiators 120 within a given column 120. The phase shifter may provide differential phasing individually to each C-Band radiator 120 along the elevation axis, or may be provided in clusters (e.g., each adjacent pair of C-Band radiators 120 are given the same phasing, etc.). It will be understood that such variations are possible and within the scope of the disclosure.

In order to provide beamforming without the contamination of grating lobes, it is required that the C-Band radiators 120 be spaced apart at a distance equal to a fraction of the center wavelength of the band in which the radiator operates. Illustrated in FIG. 1C are two types of spacing: center-to-center spacing 150, and interdipole gap spacing 155. In the case of the C-Band, a center frequency may be 4 GHz, and the center-to-center spacing 150 between adjacent C-Band radiators 120 may be 0.58λ, where λ is the wavelength corresponding to the 4 GHz center frequency. Given these parameters, the spacing of each C-Band radiator 120 may be 43.5 mm. This requirement presents a challenge in that if the outer edges of dipoles of adjacent C-Band radiators 120 get sufficiently close. In other words, if their interdipole gap spacing 155 becomes too small, it may lead to cross coupling between the neighboring C-Band radiators 120, severely degrading the performance of the C-Band 8T8R beamforming array 115. Accordingly, each C-Band radiator 120 should be designed such that it is as small as possible while maintaining sufficient gain, without incurring cross polarization contamination.

Figure 2B:
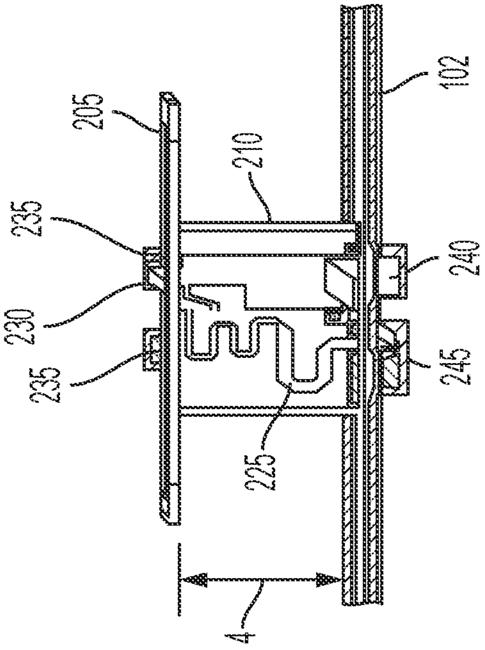
FIG. 2B is another view of the exemplary C-band radiator assembly according to the disclosure.
Figure 2A:
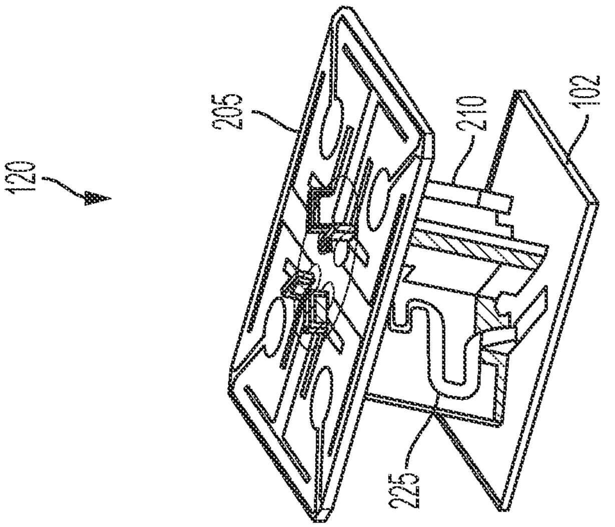
FIG. 2A illustrates an exemplary C-B and radiator assembly according to the disclosure.

FIGS. 2A and 2B illustrate an exemplary C-Band radiator 120, each from a different angle. Illustrated in both is a folded dipole 205 disposed on a balun stem 210. FIG. 2B further illustrates a balun trace 225*a*, which has a counterpart balun trace 225*b* (not shown), each of which provides a signal for its respective polarization; and a pair of mounting tabs 235. Balun stem 210 may suspend folded dipole 205 from reflector 102 by a distance h. In the case of exemplary C-Band radiator 120, the distance h may be 13 mm. The height h may be predetermined by the design of balun trace 225*a* and 225*b*, whereby the balun trace may have a meander structure that defines the length of the signal path to control the phases of the signals imparted to the crossed arms folded dipole 205. This is described in further detail below.

Figure 3A:
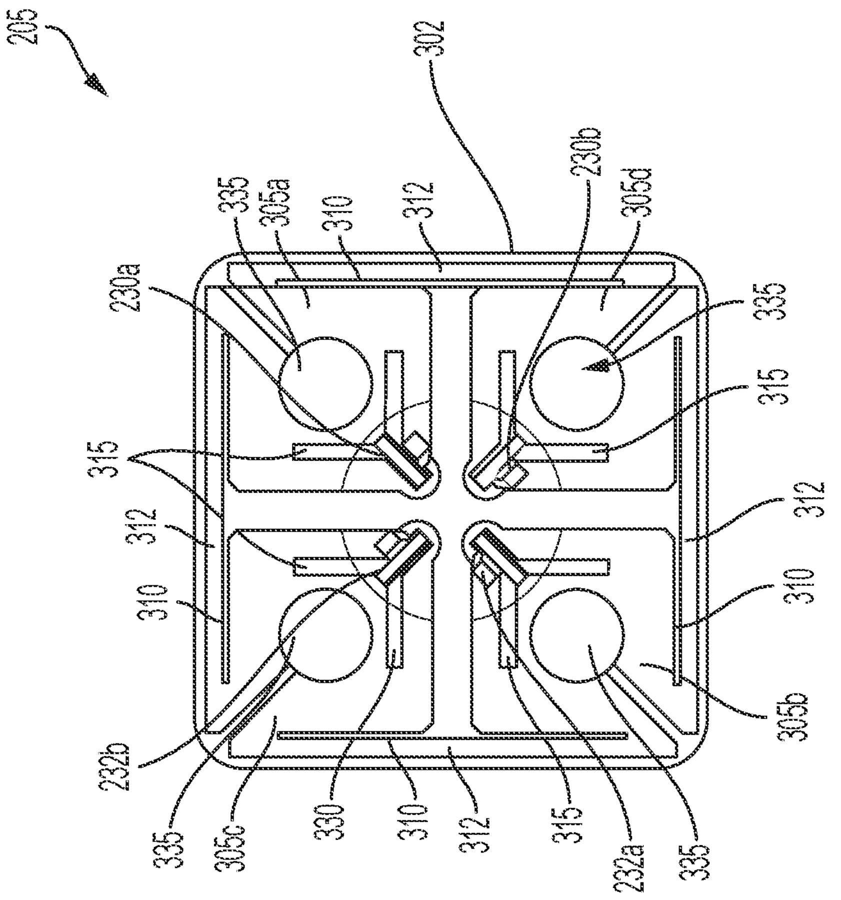
FIG. 3A illustrates an exemplary folded dipole according to the disclosure.

FIG. 3A illustrates an exemplary folded dipole 205. Folded dipole 205 may be formed of a single piece of stamped metal that is disposed on a PCB substrate 302. In an exemplary embodiment, folded dipole 205 may be formed of 1.4 mil thick Copper, disposed on an FR4 PCB. Folded dipole 205 may have four dipole arms 305*a*, 305*b*, 305*c*, and 305*d*. Dipole arms 305*a* and 305*b* are disposed diagonally to each other and coupled to the same RF signal via a single balun structure (not shown in FIG. 3); and dipole arms 305*c* and 305*d* are disposed diagonally to each other and coupled to the same RF signal (different from the RF signal coupled to dipole arms 305*a*/b) via a single balun structure (not shown in FIG. 3). Each adjacent pair of dipole arms 305*a*/b/c/d are coupled by a connecting trace 312 that is spaced from its corresponding coupled dipole arms by a gap 310. Each dipole arm 305*a*/b/c/d further includes a current channel aperture 335 and a current channel slot 315. Each current channel slot 315 engages its respective dipole arm 305*a*/b/c/d with its corresponding feed contacts. For example, dipole arm 305*a* is directly coupled to feed contact 230*a*; dipole arm 305*b* is directly coupled to feed contact 232*a*; dipole arm 305*c* is directly coupled to feed contact 232*b*; and dipole arm 305*d* is directly coupled to feed contact 230*b*. These connections are described further below with regard to FIGS. 4A-D.

Folded dipole 205 may formed in a 30.2×30.2 mm square. This offers the advantage of close spacing (e.g., at 0.58λ) to enable high quality beamforming with the adjacent folded dipoles 205 being sufficiently spaced apart to prevent coupling between them.

Figure 3B:
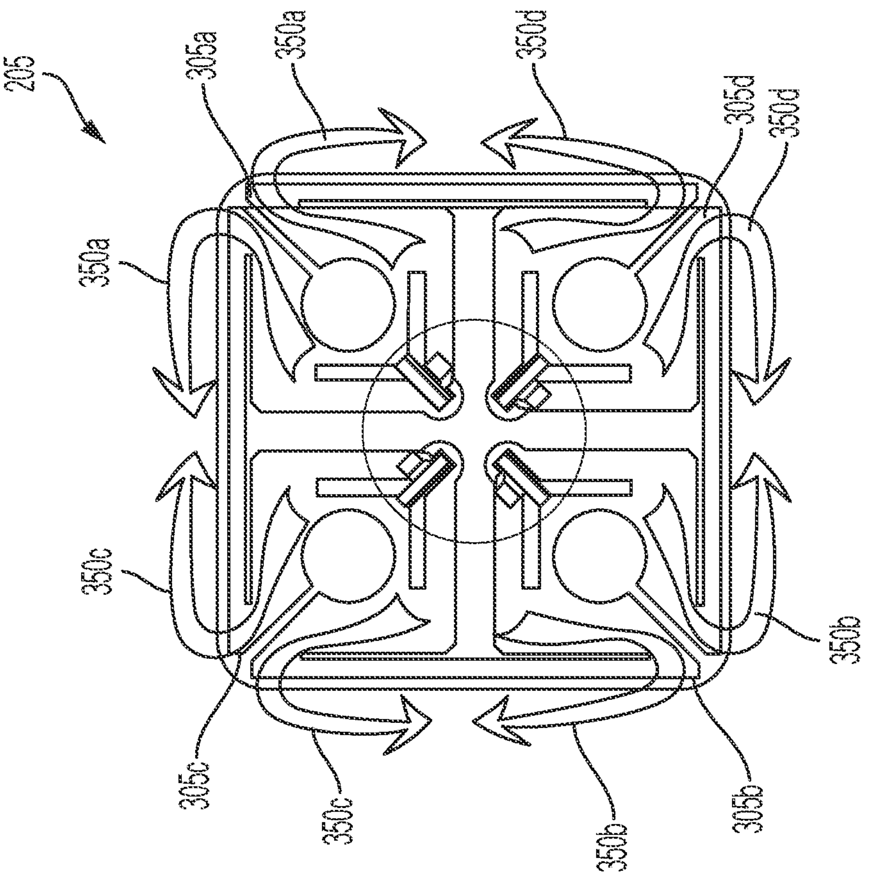
FIG. 3B illustrates an example of current flow through the folded dipole of FIG. 3A.

Folded dipole 205 operation may be described as follows. Referring to FIGS. 3B and 3A, a single RF signal is fed, via balun stem plate 210*a* (not shown) such that the signals present at feed contact 230*a* and 232*a* are ideally equal and 180 degrees out of phase from each other. This causes current flow 350*a*, channeled by corresponding current channel aperture 335, current channel slot 315, and gaps 310, through dipole arm 305*a* and respective connecting traces 312; and it causes current flow 350*b*, channeled by corresponding current channel aperture 335, current channel slot 315, and gaps 310, through dipole arm 305*b* and respective connecting traces 312. The superposition of current flows 350*a* and 350*b* results in an electromagnetic propagation along a plane diagonal to dipole 205 and defined by the axis of symmetry formed by the geometries of dipole arms 305*a* and 305*b*. The channeling of current imparted by the structure of dipole arms 305*a*/b, and their respective current channel apertures 335, current channel slots 315, and gaps 310, causes the field components perpendicular to the polarization axis to cancel. This results in an RF signal being radiated along the diagonal axis of symmetry (e.g., +45 degrees) with minimal cross polarized energy. The same but conjugate process occurs with current flows 350*b* and 350*c* respectively flowing through dipole arms 305*c* and 305*d*, channeled by their respective current channel apertures 335, current channel slots 315, and gaps 310. In this case, a single RF signal is coupled to dipole arms 305*c* and 305*d*, respectively by feed contacts 230*b* and 232*b*, whereby the signals present at feed contacts 230*b* and 232*b* are equal and 180 degrees out of phase.

Figure 4B:
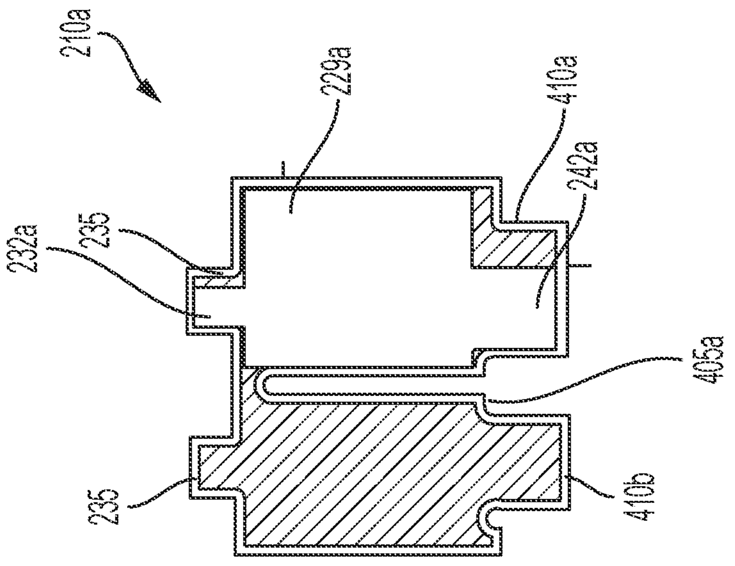
FIG. 4B illustrates an opposite side of the first balun stem plate.
Figure 4A:
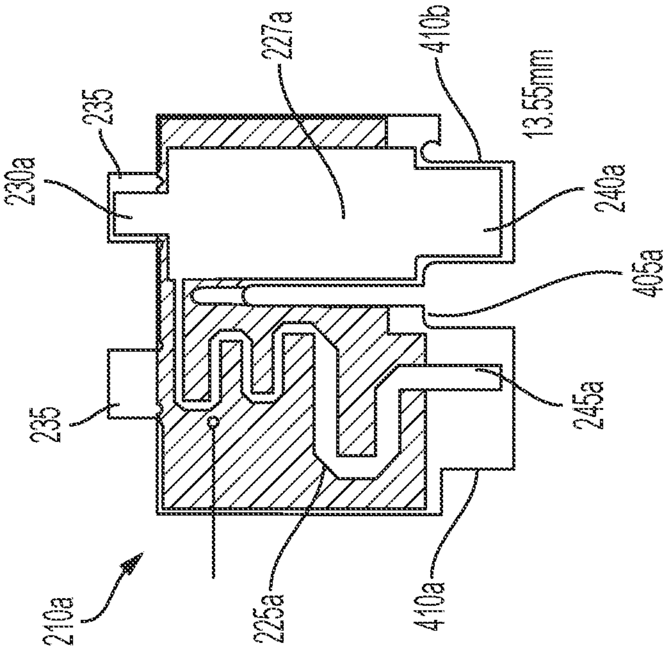
FIG. 4A illustrates an exemplary first balun trace and ground pattern disposed on a first balun stem plate according to the disclosure.
Figure 4D:
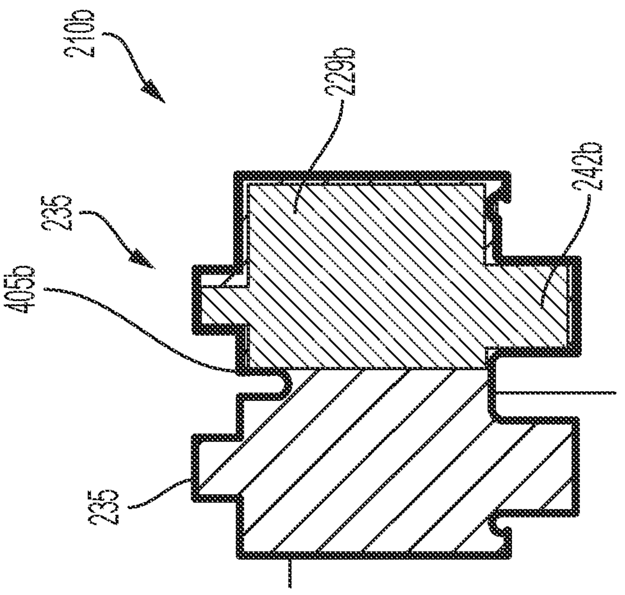
FIG. 4D illustrates an opposite side of the second balun stem plate.

FIGS. 4A and 4B illustrate opposite sides of exemplary balun stem plate 210*a* according to the disclosure. As illustrated in both FIGS. 4A and 4B, balun stem plate 210*a* has the following structural elements: mounting tabs 235 that mechanically engage with the slots 315 of dipole arms 305*a* and 305*b*; reflector mounting tabs 410*a* and 410*b* that mechanically engage with a base plate or reflector 102; and a coupling slot 405*a* that mechanically engages with balun stem plate 210*b*.

FIG. 4A illustrates the side of balun stem plate 210*a* having balun trace 225*a*, which directly couples to ground element 227*a*. Ground element 227*a* includes feed contact 230*a*, which couples to dipole arm 305*a*, and ground contact 240*a*, which couples to a ground plane (not shown) of reflector 102. Unlike conventional balun stem configurations, which have a "J-hook" balun trace that capacitively couples to a ground plane on the opposite side of the balun stem plate, balun trace 225*a* directly couples to the ground element 227*a* that is disposed on the same side of balun stem plate 210*a*. The shape and length of balun trace 225*a* may be designed so that the phase difference between the signal imparted to dipole arm 305*a* and 305*b*. Further, balun trace 225 may be designed with a meander structure to maintain phase length and enable the shortening the balun stem plate 210*a* (and thus balun stem 210). A shorter balun stem 210 (illustrated by height h in FIG. 2B) enables dipole 205 to be disposed closer to reflector 102. In an exemplary embodiment, height h may be 13 mm Having an appropriate low height h, such as 13 mm, prevents re-radiation of energy from mid band radiators 110, effectively cloaking the conductors in balun stem 210 from the mid band radiators 110. Further, an appropriately low height h, given its proximity to reflector 102, enables each C-Band radiator 120 to project energy in a gain pattern that approximates a 90 degree lobe. This offers considerable performance improvement, because having a baseline 90 degree lobe gain pattern for individual radiator assemblies 120 enables better beamforming for creating 45 degree broadcast beam; 65 degree broadcast beam; a scanned service beam; or operating in a "soft split" mode, in which one 65 degree beam can be split into two 33 degree beams for increasing network capacity.

FIG. 4B illustrates the opposite side of balun stem plate 210*a*. Disposed on this side of balun stem plate 210*a* is a second ground element 229*a*, which is disposed on balun stem plate 210*a* opposite balun trace 225*a*. Second ground element 229*a* has a feed contact 232*a*, which couples to dipole arm 305*b*. Feed contact 232*a* is disposed on the mounting tab 235 that mechanically couples with dipole arm 305*b* via its corresponding slot 330.

The design and arrangement of balun trace 225*a*, the direct coupling of balun trace 225*a* to ground element 227*a* on the same side of balun stem plate 210*a*, and capacitive coupling of balun trace 225*a* to second ground element 220*a*, combine to provide more linear coupling of the RF signal fed to balun trace 225*a* to dipole arms 305*a* and 305*b*. A further advantage is that this design provides for a more precise 180 degree phase differentiation between the signals imparted to the two dipole arms 305*a* and 305*b*. Improving the phase between dipole arms 305*a* and 305*b* further mitigates cross polarization between the signals radiated by dipole arms 305*a*/b and 305*c/d*. These advantages of this design apply across the C-Band frequencies.

Figure 4C:
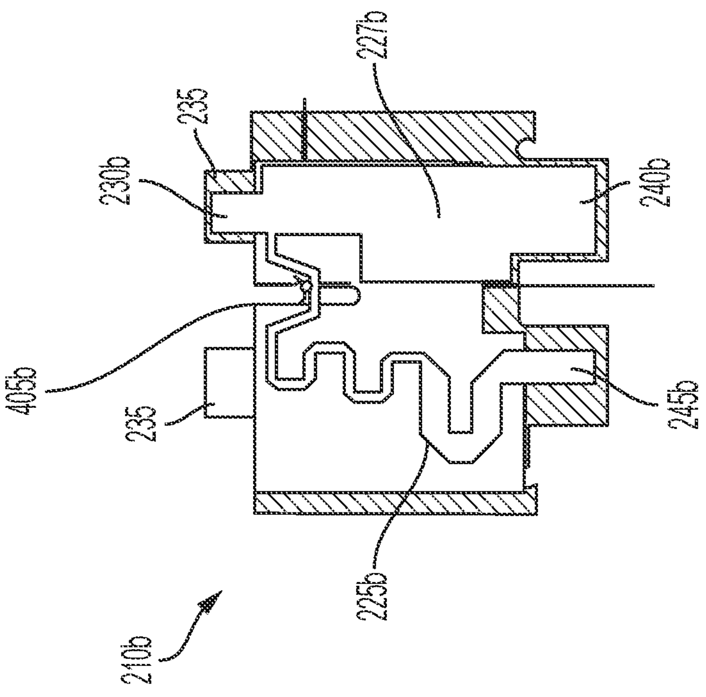
FIG. 4C illustrates an exemplary second balun trace and ground pattern disposed on a second balun stem plate according to the disclosure.

FIG. 4C illustrates the side of balun stem plate 210*b* having balun trace 225*b*, which directly couples to ground element 227*b*. Ground element 227*b* includes feed contact 230*b*, which couples to dipole arm 305*c*, and ground contact 240*b*, which couples to a ground plane (not shown) of reflector 102. Balun trace 225*b* and its direct connection to ground element 227*b*, both of which are disposed on the same side of balun stem plate 210*b*, are substantially similar to the counterpart components on balun stem plate 225*a*. A difference between balun stem plate 210*b* and 210*a* is that the coupling slot 405*b* is disposed on the side of balun stem plate 210*b* that faces the folded dipole 205. This enables balun stem plate 210*a* to mechanically engage balun stem plate 210*b* via their respective coupling slots 405*a*/b, forming a balun stem 210 having a cruciform shape. The location of coupling slot 405*b* in balun stem plate 210*b* requires balun trace 225*b* to take a different path to accommodate it. The modified design of balun trace 225*b* and ground element 227*b* may be done, as illustrated in FIG. 4C, so that the same advantages in phase precision, linearity, and reduced cross polarization apply to dipole arms 305*b*/c as they do for dipole arms 305*a*/b.

Figure 5:
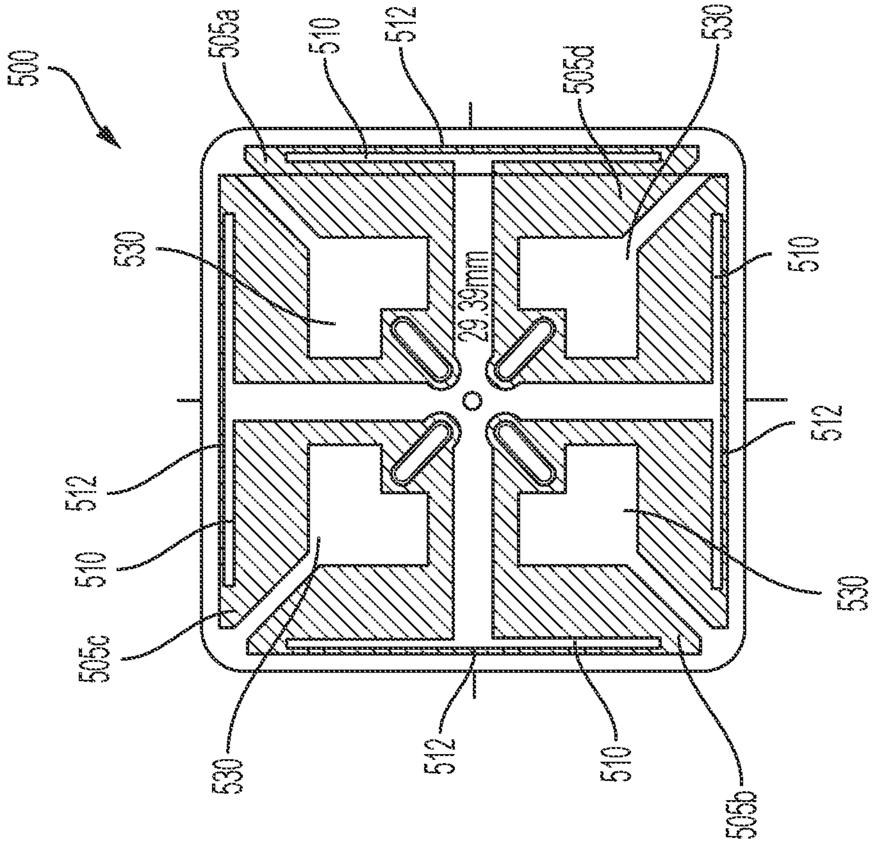
FIG. 5 illustrates another exemplary folded dipole for providing high performance in both the CBRS bands and the C-Band, according to the disclosure.

FIG. 5 illustrates another exemplary folded dipole 500, which has improved performance in the CBRS range (3.55-3.7 GHz) of the C-Band (3.4-4.2 GHz). Folded dipole 500 has four dipole arms 505*a-d*, wherein adjacent dipole arms are coupled by a connecting trace 512, which is separated from the body of each corresponding dipole arm 505*a-d* by a gap 510. Each dipole arm 505*a-d* has a current channel aperture 530, which may direct current densities within the dipole arm 505*a-d* in a manner similar to the combination of current channel aperture 335 and current channel slot 315 of dipole arms 305*a-d*. Folded dipole 500 may have a square shape with dimensions of 29.39 mm×29.39 mm and may operate with a conventional J-hook balun.

Figure 6:
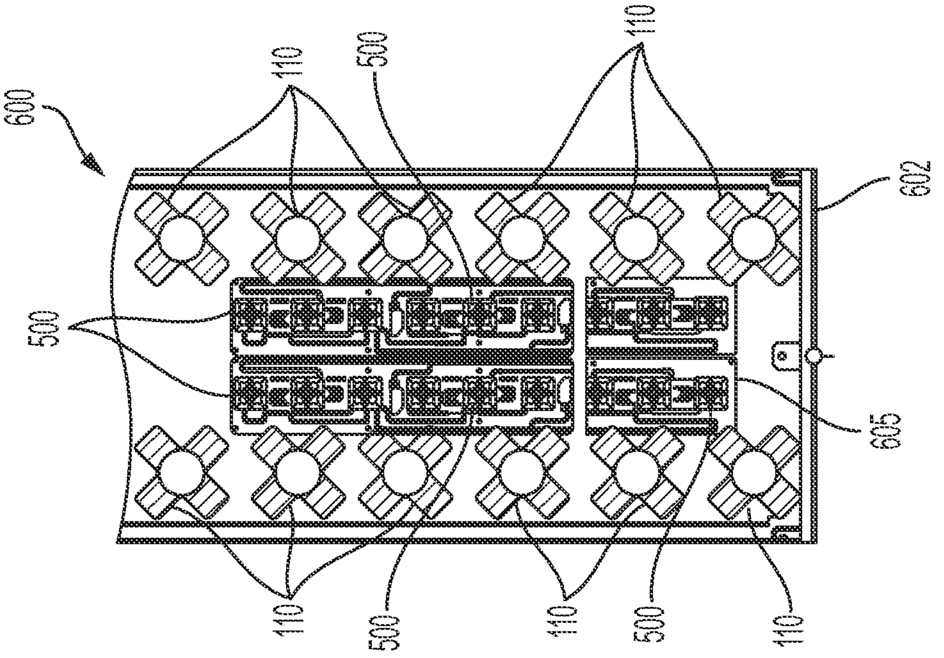
FIG. 6 illustrates an exemplary array face, or portion of a larger array face, having a CBRS array and a plurality of mid band radiators according to the disclosure.

FIG. 6 illustrates an exemplary array face 600, which may be a portion of a larger array face, according to the disclosure. Array face 600 has a plurality of CBRS radiator assemblies 605, each of which having exemplar. While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

y folded dipole 500. The CBRS radiator assemblies 605 may be arranged so that the center-to-center spacing of folded dipoles 500 is 50 mm, which offers good isolation. Array face 600 may also have a plurality of mid band radiators 110, which may be substantially similar to the mid band radiators 110 of exemplary array face 100*a*.

While various embodiments of the present invention have been described above, it should be understood that they have been presented by way of example only, and not limitation.

It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. A radiator assembly configured to radiate two orthogonally polarized radio frequency signals, comprising:

a folded dipole having a first pair of dipole arms configured to radiate in a first polarization orientation and a second pair of dipole arms configured to radiate in a second polarization orientation, wherein the folded dipole is formed of a single conductive plate;

a balun stem mechanically coupled to the folded dipole, the balun stem having a first balun stem plate configured to couple a first radio frequency signal to the first pair of dipole arms and a second balun stem plate configured to couple a second radio frequency signal to the second pair of dipole arms; and a reflector plate, wherein the folded dipole is suspended from the reflector plate by the balun stem.

2. The radiator assembly of claim 1, wherein the first pair of dipole arms comprises a first dipole arm and a second dipole arm, wherein the first dipole arm and the second dipole arm are axially symmetric around a first axis that is parallel to the first polarization orientation, and wherein the second pair of dipole arms comprises a third dipole arm and a fourth dipole arm, wherein the third dipole arm and the fourth dipole arm are axially symmetric around a second axis that is parallel to the second polarization orientation.

3. The radiator assembly of claim 2, wherein the first dipole arm, the second dipole arm, the third dipole arm, and the fourth dipole arm each comprise a current channel aperture.

4. The radiator assembly of claim 3, wherein the first dipole arm, the second dipole arm, the third dipole arm, and the fourth dipole arm each comprise a current channel slot.

5. The radiator assembly of claim 2, wherein the first dipole arm is coupled to the third dipole arm by a first connecting trace, the first connecting trace defining a first gap between the first connecting trace and the first dipole arm and the third dipole arm, the first dipole arm is coupled to the fourth dipole arm by a second connecting trace, the second connecting trace defining a second gap between the second connecting trace and the first dipole arm and the fourth dipole arm, and wherein the second dipole arm is coupled to the third dipole arm by a third connecting trace, the third connecting trace defining a third gap between the third connecting trace and the first dipole arm and the third dipole arm, the second dipole arm is coupled to the fourth dipole arm by a fourth connecting trace, the fourth connecting trace defining a fourth gap between the fourth connecting trace and the first dipole arm and the fourth dipole arm.

6. The radiator assembly of claim 1, wherein the first pair of dipole arms comprises a first dipole arm and a second dipole arm, wherein the first balun stem plate comprises a first balun trace and a first ground element disposed on a first side, and a second ground element disposed on a second side, wherein the first balun trace is conductively coupled to the first ground element.

7. The radiator assembly of claim 6, wherein the first ground element is conductively coupled to the first dipole arm and the second ground element is conductively coupled to the second dipole arm.

8. The radiator assembly of claim 6, wherein the first balun trace comprises a meander structure, wherein the meander structure is configured to maintain a 180-degree phase difference between the first radio frequency signal coupled to the first dipole arm and the second radio frequency signal coupled to the second dipole arm.

* * * * *